United States Patent
Jansen

(10) Patent No.: US 6,180,805 B1
(45) Date of Patent: Jan. 30, 2001

(54) PHOTOCHEMICAL PROCESS FOR THE PRODUCTION OF PREVITAMIN D3

(75) Inventor: Michael Jansen, Bartenheim (FR)

(73) Assignee: Roche Vitamins Inc., Parsippany, NJ (US)

( * ) Notice: Under 35 U.S.C. 154(b), the term of this patent shall be extended for 0 days.

(21) Appl. No.: 09/338,784

(22) Filed: Jun. 23, 1999

(30) Foreign Application Priority Data

Jun. 23, 1998 (EP) ................................. 98111492

(51) Int. Cl.$^7$ ................................................. C07C 401/00
(52) U.S. Cl. ................ 552/653; 204/157.67; 204/157.69
(58) Field of Search ......................... 204/157.67, 157.69; 552/653

(56) References Cited

U.S. PATENT DOCUMENTS

| | | | |
|---|---|---|---|
| 4,388,242 | 6/1983 | Malatesta et al. | 552/653 |
| 4,539,153 | * 9/1985 | Vandewalle et al. | 544/229 |
| 4,686,023 | 8/1987 | Stevens | 204/157.67 |
| 5,543,016 | * 8/1996 | Fehlner et al. | 204/157.67 |
| 5,614,723 | * 3/1997 | Oppenlander et al. | 250/435 |

FOREIGN PATENT DOCUMENTS

| | | |
|---|---|---|
| 279 668 A1 | of 1990 | (DE) . |
| 0 118 903 A1 | of 1984 | (EP) . |
| 0 697 374 A1 | of 1996 | (EP) . |

OTHER PUBLICATIONS

Chemical Abstracts, vol. 114, No. 9, abstract No. 82251 (1991) No Month Available.
Database Compendex Online Engineering Information, Inc., New York, database accession No. EIX93091650168 XP–002116900 (1993) No Month Available.
Derwent English language abstract of EP 0 118 903 A1.
Derwent English language abstract of DD 279 668 A1.

* cited by examiner

Primary Examiner—Kathryn Gorgos
Assistant Examiner—Thao Tran
(74) Attorney, Agent, or Firm—Mark E. Waddell; Stephen M. Haracz; Bryan Cave LLP

(57) ABSTRACT

A photochemical process for the production of previtamin $D_3$ or a derivative thereof from 7-dehydrocholesterol is disclosed. The process includes irradiating the 7-dehydrocholesterol in a reactor with a UV radiation source, wherein the UV source includes an excimer or exciplex emitter which emits quasi-monochromatically according to the corona discharge mechanism in the UV range, and recovering previtamin $D_3$ or a derivative thereof. Previtamin $D_3$ compositions and derivatives made from this process are also provided.

4 Claims, 2 Drawing Sheets

PHOTOCHEMICAL PROCESS FOR THE PRODUCTION OF PREVITAMIN D3

FIELD OI THE INVENTION

The present invention relates to a photochemical process for the production of previtamin $D_3$ or a derivative thereof from 7-dehydrocholesterol in a reactor having a UV radiation source. More particularly, the present invention relates to the production of previtamin $D_3$ or a derivative thereof from 7-dehydrocholesterol using an excimer or exciplex emitter that emits photons at an optimal wavelength for such a process. Products formed by such a process are also provided.

BACKGROUND OF THE OF INVENTION

Reportedly, previtamin $D_3$ may be obtained from 7-dehydrocholesterol (7-DHC) by irradiation. This previtamin may be converted by thermal rearrangement into vitamin $D_3$, which is thermally more stable.

Various sources of irradiation have been considered to drive the 7-DHC to previtamin $D_3$ reaction. For example, the process of forming photons from excimer or exciplex reactions is known from laser technology. Laser photon sources, however, are not suitable for photochemical synthesis of previtamin $D_3$ because of their high technical complexity and the fact that their radiation geometry has little suitability for preparative photochemistry and the associated radiation density is insufficient over a large area.

Conventional photochemical synthesis of previtamin $D_3$ on an industrial scale reportedly has been effected by irradiation of 7-DHC using medium-pressure mercury lamps. Because the starting material (7-DHC), the primary product (previtamin $D_3$) as well as byproducts, absorb with different efficiency in the same wavelength range, polychromatic radiation of the kind supplied by these lamps favours the formation of photochemical byproducts which are inactive and in some cases toxic. Therefore, with the present state of the art, it is necessary to interrupt the irradiation after relatively low conversion of the 7-DHC to previtamin to $D_3$. The unconverted 7-DHC is recycled while the primary product (previtamin $D_3$) must be purified in an expensive working up procedure.

Filter effects are a further consequence of substrates and products which absorb in the same wavelength range. For example, when the absorption spectrum of previtamin $D_3$ overlaps completely with that of 7-DHC, the previtamin absorbs a continuously increasing proportion of the light as the conversion proceeds.

Another reason for interrupting the conventional reaction after a relatively low conversion (10–20%) of 7-DHC to previtamin $D_3$ is the fact that the quantum yield (i.e., the efficiency) of the subsequent photochemical reaction of previtamin D to, e.g. tachysterol, is greater than the quantum yield of the formation of the desired product (previtamin $D_3$). Thus, in conventional reactions, the efficiency of the reaction is decreased while the cost of production of the end product is increased.

Another significant problem during conventional production of previtamin $D_3$ is the poor correlation between the emission spectrum of medium-pressure mercury lamps and the absorption spectrum of 7-DHC. Thus, in conventional processes using medium-pressure mercury lamps only about 1% of the radiation radiating therefrom is in the desired range, i.e., between about 280 and about 300 nm. Moreover, because the radiation spectrum produced by a conventional medium-pressure mercury lamp is not optimized for the 280–300 nm wavelength, a large amount of undesired byproducts are produced by irradiation outside this optimum wavelength region.

Accordingly, one object of present the invention is to provide a photolytic process for the production of previtamin $D_3$ from 7-dehydrocholesterol, which process has fewer disadvantages than the prior-art procedure.

The present invention is directed to meeting this and other objects.

SUMMARY OF THE INVENTION

The invention is a photochemical process for the production of previtamin $D_3$ or a derivative thereof from 7-dehydrocholoesterol. This process includes irradiating the 7-dehydrocholoesterol in a reactor with a UV source wherein the UV source includes an excimer or exciplex emitter that emits quasi-monochromatically according to the corona discharge mechanism in the UV range. The process also includes recovering the previtamin $D_3$ product produced.

Another embodiment is a $D_3$ compound or derivative thereof produced by the process which includes providing a reaction mixture that includes 7-dehydrocholoesterol in a reactor. The process further includes irradiating the reaction mixture with UV radiation produced from a UV source having an excimer or exciplex emitter that emits quasi-monochromatically according to the corona discharge mechanism. The previtamin $D_3$ or derivative thereof produced from such a reaction is then recovered.

DETAILED DESCRIPTION OF THE INVENTION

Figure 1:
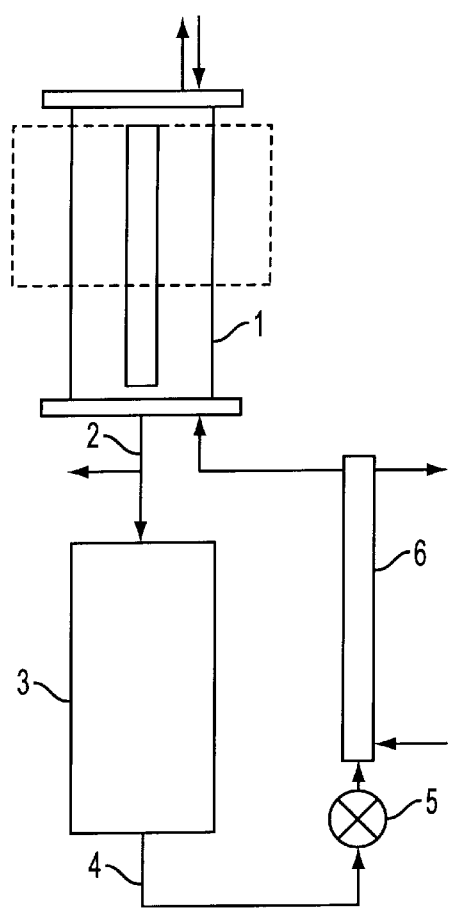
FIG. 1 is a diagram depicting the process of the present invention in a falling-film reactor.

In the present invention, significantly improved levels of previtamin $D_3$ production from 7-DHC are achieved by using as the radiation source an excimer or exciplex emitter which emits quasi-monochromatic radiation according to the 'corona' discharge mechanism in the UV region.

As used herein, an excimer emitter is a device that is capable of causing the formation of a substance by the joining of two atoms (or two molecules of the same chemical composition) in an excited state.

For purposes of the present invention, an exciplex emitter is a device, which is capable of forming an electronically excited molecular complex, i.e., an excited state complex formed from different molecules, which is unstable in the ground state.

The emission wavelength of these emitters is determined by the composition of excimer-forming or exciplex-forming gas(es) contained therewithin. Excimer and exciplex emitters have the special property that they are very variable as to their shape and dimension and emit over a very narrow wavelength range. In the present invention, such emitters may therefore be selected and constructed in an optimum manner corresponding to the required reaction conditions in the context of the available gases and materials.

As a consequence of using the emitters of the present invention, the amount of electric power required per kg of product is considerably reduced compared to conventional processes. Moreover, the monochromatic radiation of excimer or exciplex emitters leads to a considerable improvement in the purity of the product.

With the emitters used in accordance with the present invention there are accordingly employed for the first time radiation sources which emit almost exclusively in the optimum wavelength range for the photochemical synthesis of previtamin $D_3$. Such emitters are therefore well-suited light sources for the synthesis of previtamin $D_3$ on an industrial scale.

In the present invention, excimer emitters may be filled with rare gas atoms or a mixture of rare gas atoms and halogen atoms, such as for example, XeBr or $Br_2$ which emit photons at a wavelength of about 285 or about 292 nm. Such gasses are typical examples of emitters having an emission wavelength which lies in the optimum wavelength range required for the synthesis of previtamin $D_3$ (i.e., about 280 to about 300 nm). The emission spectrum of the XeBr lamp is shown by way of example in FIG. 3. The exemplification of the XeBr lamp, however, is not intended to limit the scope of the present invention in any way.

In the case of the emitters that may be used in accordance with the invention, there are formed excimers ($Br_2$) or exciplexes (XeBr) which on disintegration emit photons having the desired wavelength. Both types of emitters have been found to be good and efficient sources of radiation when used for photochemical synthesis of previtamin $D_3$.

The process in accordance with the present invention may also be used to produce derivatives of previtamin $D_3$ including hydroxylated or acylated forms thereof, such as for example, 1-hydroxy, or 25-hydroxy, or acyloxy previtamin $D_3$.

The invention will now be further illustrated in the following non-limiting example representing presently preferred embodiments of the invention.

EXAMPLE 1

A 3.5% solution of 7-Dehydrocholesterol in a methanol/hexane mixture was irradiated with a XeBr lamp at 284 nm in a falling-film reactor as described in more detail below. The composition of the reaction system was determined at regular time intervals by high performance liquid chromatography. At this wavelength (284 nm) over 93% of the reaction mixture obtained consisted of the desired previtamin $D_3$, with a conversion of about 50%. The starting material could be separated readily according to known methods.

Turning now to the figures, the apparatus shown in FIG. 1 includes a falling-film reactor 1 with an output line 2 directly connected to a receiver 3. The receiver contains most of the reaction mixture. A feed line 4 for the reaction mixture leads from the receiver to the falling-film reactor via a pump 5 and a heat exchanger 6. The falling-film reactor is equipped with lines for continuously flushing its interior with nitrogen.

The output line 2 is provided with a connection for continuous sampling of the reaction mixture.

Figure 2:
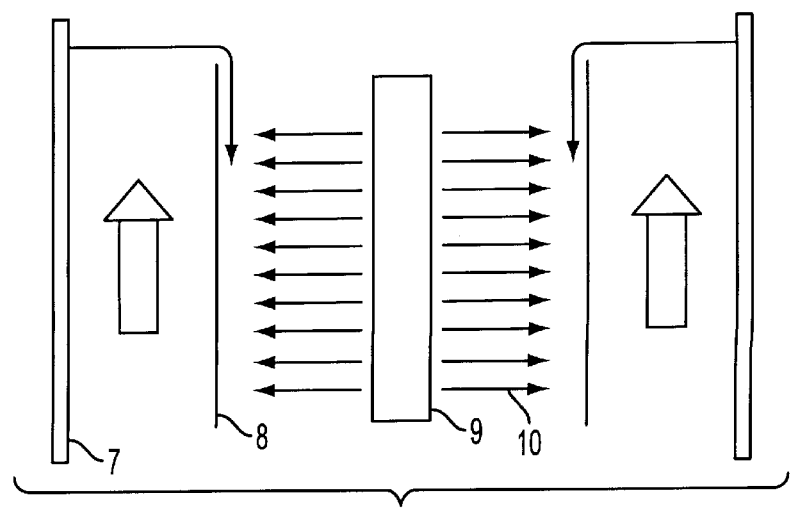
FIG. 2 is a diagram depicting an enlarged section of the falling-film reactor of FIG. 1.

The construction of the falling-film reactor 1 will be evident from the larger scale sectional view of FIG. 2. In particular, the falling film reactor has an outer cylindrical jacket 7 and a cylindrical quartz downpipe 8 coaxially disposed in the interior thereof. An excimer emitter 9 is placed in the middle of the reactor, also coaxially.

The reaction mixture enters the reactor from below and is conveyed upwards as a volume flow in the annular space between the jacket and the downpipe. From there, the mixture flows downwards as a film on the inside of the downpipe. The film is exposed to radiation 10 emitted by the emitter.

Figure 3:
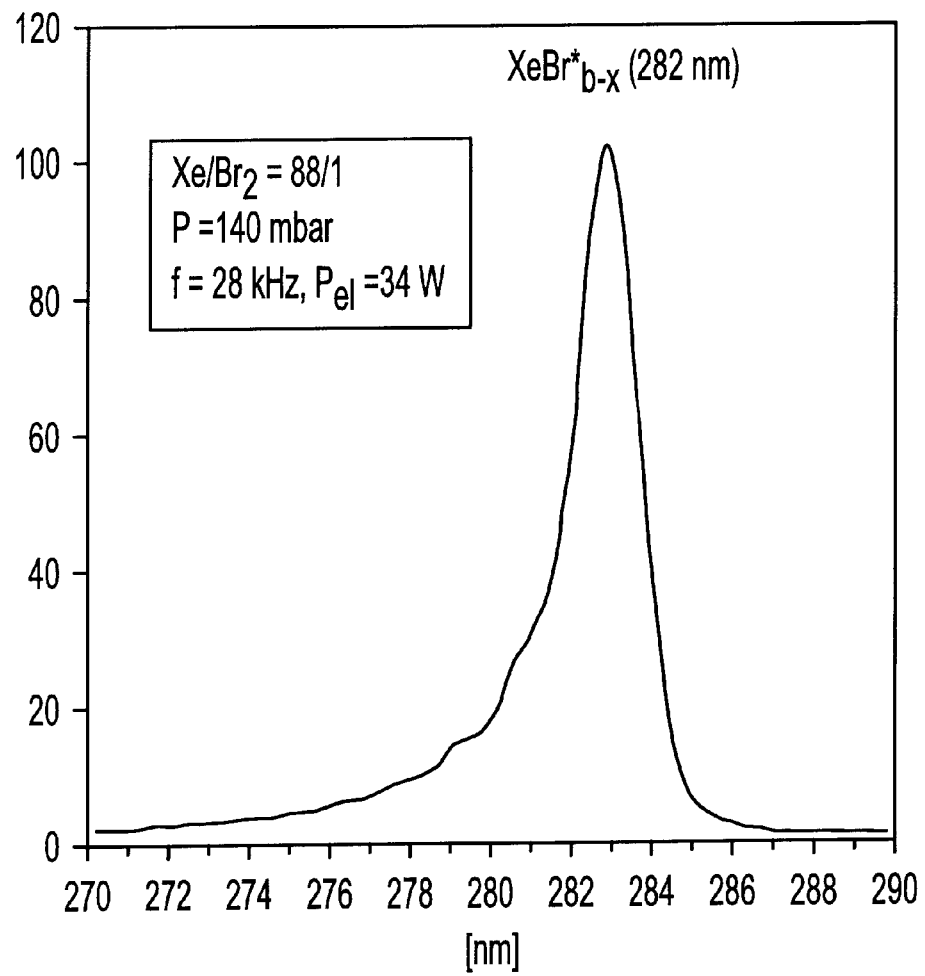
FIG. 3 is a graph showing the emission spectrum of a suitable emitter according to the present invention.

In the emission spectrum of the xenon bromide (XeBr) excimer emitter used in the apparatus and shown in FIG. 3, the abscissa axis gives the wavelength in nm of emitted radiation and the ordinate axis gives the relative intensity.

The invention being thus described, it will be obvious that the same may be varied in many ways. Such variations are not to be regarded as a departure from the spirit and scope of the invention and, all such modifications are intended to be included within the scope of the following claims.

We claim:

1. A photochemical process for the production of previtamin $D_3$ or a derivative thereof from 7-dehydrocholesterol comprising:

(a) irradiating 7-dehydrocholesterol in a falling film reactor with a UV radiation source, wherein the UV radiation source comprises an excimer or exciplex emitter containing XeBr which emits quasi-monochromatically according to the corona discharge mechanism in the UV range; and (b) recovering the previtamin $D_3$ or derivative thereof.

2. The process according to claim 1, wherein the derivative is a hydroxylated or acylated form of previtamin $D_3$.

3. The process according to claim 2, wherein the hydroxylated or acylated derivative is selected from the group consisting of 1α-hydroxy previtamin $D_3$, 25-hydroxy previtamin $D_3$, and acyloxy previtamin $D_3$.

4. A previtamin $D_3$ compound or derivative thereof produced by a process comprising:

(a) providing a reaction mixture comprising 7-dehydrocholesterol in a falling film reactor;

(b) irradiating the reaction mixture with UV radiation produced from a UV source comprising an excimer or an exciplex emitter containing XeBr which emits quasi-monochromatically according to the corona discharge mechanism; and (c) recovering the previtamin $D_3$ compound or derivative thereof from the reaction mixture.

* * * * *

UNITED STATES PATENT AND TRADEMARK OFFICE
Certificate

Patent No. 6,180,805 B1                                     Patented: January 30, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael Jansen, Bartenheim, France; André M. Braun, Barbelroth, Germany; Hanns-Peter Popp, Berg, Germany; and Gabriele Tröscher, Karlsruhe, Germany.

Signed and Sealed this Twenty-fourth Day of February 2004.

*JAMES J. SEIDLECK*
*Supervisory Patent Examiner*
Art Unit 1711